United States Patent
Ng et al.

(10) Patent No.: US 10,803,418 B2
(45) Date of Patent: Oct. 13, 2020

(54) PROVISIONING TEMPORARY FUNCTIONALITY TO USER DEVICES

(71) Applicant: Square, Inc., San Francisco, CA (US)

(72) Inventors: Claudia Ng, San Bruno, CA (US); John Lewis, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 542 days.

(21) Appl. No.: 15/454,892

(22) Filed: Mar. 9, 2017

(65) Prior Publication Data

US 2018/0260768 A1    Sep. 13, 2018

(51) Int. Cl.
| | |
|---|---|
| *G06Q 10/00* | (2012.01) |
| *G06Q 10/08* | (2012.01) |
| *G06F 8/60* | (2018.01) |
| *H04L 29/06* | (2006.01) |
| *G06Q 20/20* | (2012.01) |

(52) U.S. Cl.
CPC .............. *G06Q 10/087* (2013.01); *G06F 8/60* (2013.01); *G06Q 10/00* (2013.01); *G06Q 20/203* (2013.01); *H04L 63/083* (2013.01); *H04L 63/10* (2013.01)

(58) Field of Classification Search
CPC ........................... G06Q 10/087; G06Q 20/203
USPC ............................................................. 705/22
See application file for complete search history.

(56) References Cited

U.S. PATENT DOCUMENTS

| | | | |
|---|---|---|---|
| 5,819,231 | A | 10/1998 | Tremaine |
| 5,878,337 | A | 3/1999 | Joao et al. |
| 6,571,218 | B1 | 5/2003 | Sadler |
| 6,873,964 | B1 | 3/2005 | Williams et al. |
| 7,209,891 | B1 | 4/2007 | Addy et al. |
| 7,764,185 | B1 | 7/2010 | Manz et al. |
| 7,810,729 | B2 | 10/2010 | Morley, Jr. |
| 7,870,028 | B2 | 1/2011 | Kloubakov et al. |
| 8,001,057 | B1 | 8/2011 | Hill |
| 8,442,208 | B2 | 5/2013 | Shaffer et al. |
| 8,478,618 | B2 | 7/2013 | Coleman et al. |

(Continued)

FOREIGN PATENT DOCUMENTS

| | | |
|---|---|---|
| AU | 2018201228 A1 | 3/2018 |
| EP | 0 993 191 A2 | 4/2000 |

(Continued)

OTHER PUBLICATIONS

Non-Final Office Action dated Jan. 10, 2019, for U.S. Appl. No. 15/630,769 of Haley, E., filed Jun. 22, 2017.

(Continued)

*Primary Examiner* — Rokib Masud
(74) *Attorney, Agent, or Firm* — Leel & Hayes, P.C.

(57) ABSTRACT

Techniques for temporarily providing access to a functionality associated with a service to one or more personal devices corresponding to one or more users is described. In an example, an entity device may provision temporary access to a functionality associated with a service that benefits the entity to a personal device operated by a user. The personal device may utilize the functionality to perform a task, such as inventory data collection. The entity device may determine an occurrence of an event, and based at least in part on the occurrence of the event, may terminate the provisioning of the temporary access to the functionality. The entity device may receive data, such as inventory data, from the personal device and may send the data to a payment processing system.

20 Claims, 7 Drawing Sheets

(56) References Cited

U.S. PATENT DOCUMENTS

| | | | |
|---|---|---|---|
| 8,601,002 | B1 | 12/2013 | Ali et al. |
| 9,064,285 | B1 | 6/2015 | Nathoo |
| 9,727,827 | B2 | 8/2017 | Hyder et al. |
| 9,824,323 | B1 | 11/2017 | Weiss et al. |
| 9,882,914 | B1 | 1/2018 | Co |
| 10,515,342 | B1 | 12/2019 | Haley |
| 2002/0022982 | A1 | 2/2002 | Cooperstone et al. |
| 2003/0120531 | A1 | 6/2003 | Parker |
| 2003/0204447 | A1 | 10/2003 | Dalzell et al. |
| 2005/0192823 | A1 | 9/2005 | Kuhn et al. |
| 2006/0047530 | A1 | 3/2006 | So et al. |
| 2006/0138219 | A1* | 6/2006 | Brzezniak ........ G06Q 30/0601 235/383 |
| 2006/0243798 | A1 | 11/2006 | Kundu et al. |
| 2007/0038503 | A1 | 2/2007 | Krajcev et al. |
| 2007/0039024 | A1 | 2/2007 | Krajcev et al. |
| 2007/0204156 | A1* | 8/2007 | Jeghers ............ H04W 12/0609 713/168 |
| 2007/0208572 | A1 | 9/2007 | Habichler et al. |
| 2007/0239468 | A1 | 10/2007 | O'Brien et al. |
| 2007/0272734 | A1 | 11/2007 | Lipton et al. |
| 2008/0120129 | A1 | 5/2008 | Seubert et al. |
| 2008/0177624 | A9 | 7/2008 | Dohse |
| 2008/0197188 | A1 | 8/2008 | Jagatic et al. |
| 2008/0255929 | A1 | 10/2008 | Mouton |
| 2008/0306750 | A1 | 12/2008 | Wunder et al. |
| 2009/0094239 | A1 | 4/2009 | Sabol et al. |
| 2009/0144102 | A1 | 6/2009 | Lopez |
| 2009/0210331 | A1 | 8/2009 | Boone et al. |
| 2009/0303040 | A1 | 12/2009 | Srinivasa et al. |
| 2009/0320088 | A1 | 12/2009 | Gill et al. |
| 2010/0211469 | A1 | 8/2010 | Salmon et al. |
| 2010/0269059 | A1 | 10/2010 | Othmer et al. |
| 2011/0131105 | A1 | 6/2011 | Aonuma et al. |
| 2012/0130774 | A1 | 5/2012 | Ziv et al. |
| 2012/0173570 | A1 | 7/2012 | Golden |
| 2012/0266258 | A1 | 10/2012 | Tuchman et al. |
| 2013/0067547 | A1 | 3/2013 | Thavasi et al. |
| 2013/0132140 | A1 | 5/2013 | Amin et al. |
| 2013/0132246 | A1 | 5/2013 | Amin et al. |
| 2013/0132274 | A1 | 5/2013 | Henderson et al. |
| 2013/0132887 | A1 | 5/2013 | Amin et al. |
| 2013/0159154 | A1 | 6/2013 | Purves et al. |
| 2013/0246207 | A1 | 9/2013 | Novak et al. |
| 2013/0246301 | A1 | 9/2013 | Radhakrishnan et al. |
| 2013/0262479 | A1 | 10/2013 | Liang et al. |
| 2013/0301820 | A1 | 11/2013 | Williams et al. |
| 2013/0311836 | A1 | 11/2013 | Hurst et al. |
| 2013/0325734 | A1 | 12/2013 | Bixler et al. |
| 2014/0032382 | A1 | 1/2014 | Hamann et al. |
| 2014/0129135 | A1 | 5/2014 | Holden et al. |
| 2014/0129302 | A1 | 5/2014 | Amin et al. |
| 2014/0129951 | A1 | 5/2014 | Amin et al. |
| 2014/0201001 | A1 | 7/2014 | Rellas et al. |
| 2014/0201100 | A1 | 7/2014 | Rellas et al. |
| 2014/0207500 | A1 | 7/2014 | Krajcev et al. |
| 2014/0258161 | A1 | 9/2014 | Brown et al. |
| 2014/0279102 | A1 | 9/2014 | Hartman et al. |
| 2014/0358803 | A1 | 12/2014 | Carter et al. |
| 2015/0161665 | A1 | 6/2015 | Grimes et al. |
| 2015/0213413 | A1 | 7/2015 | Faron et al. |
| 2015/0242922 | A1 | 8/2015 | Zamer |
| 2015/0269508 | A1 | 9/2015 | Damboritz et al. |
| 2015/0332242 | A1 | 11/2015 | Perry et al. |
| 2016/0055322 | A1 | 2/2016 | Thomas |
| 2016/0071038 | A1 | 3/2016 | Puttaswamy et al. |
| 2016/0171516 | A1 | 6/2016 | Brosnan et al. |
| 2016/0217470 | A1 | 7/2016 | Gerard et al. |
| 2016/0224205 | A1 | 8/2016 | Fulton |
| 2016/0239806 | A1 | 8/2016 | Benham et al. |
| 2017/0316382 | A1 | 11/2017 | Colner |

FOREIGN PATENT DOCUMENTS

| | | |
|---|---|---|
| WO | 02/44981 A1 | 6/2002 |
| WO | 2016/011287 A1 | 1/2016 |
| WO | 2018/164839 A1 | 9/2018 |

OTHER PUBLICATIONS

First Examination Report for Australian Patent Application No. 2018201228, dated Feb. 26, 2019.

Non-Final Office Action dated Mar. 4, 2019, for U.S. Appl. No. 15/476,740 of Ho, V., et al., filed Mar. 31, 2017.

"Card Not Present Transaction," Wikipedia, published Mar. 4, 2014, Retrieved from the Internet URL: http://en.wikipedia.org/wiki/Card_not_present_transaction, on Jun. 6, 2014, pp. 1-2.

Goode, L., "Paying With Square's New Mobile-Payments App," All Things D, dated Apr. 30, 2012, Retrieved from the Internet URL: http://allthingsd.com/20120430/paying-with-squares-new-mobile-payments-app/, on Nov. 7, 2014, pp. 1-3.

Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.

Myres, L., "The Mac Security Blog: What is Multi-Factor Authentication, and How Will It Change in the Future?," Intego, dated Aug. 17, 2012, Retrieved from the Internet URL: http://www.intego.com/mac-security-blog/what-is-multi-factor-authentication-and-how-will-it-change-in-the-future/, on Nov. 11, 2014, pp. 1-4.

"Online Shopping," dated Nov. 2, 2014, Retrieved from the Internet URL: http://en.wikipedia.org/wiki/Online_shopping, on Nov. 10, 2014, pp. 1-12.

"Payment Gateway," Wikipedia, published May 30, 2014, Retrieved from the Internet URL: http://en.wikipedia.org/wiki/Pavment gateways, on Jun. 6, 2014, pp. 1-3.

"Uber—Android Apps on Google Play," Published on Nov. 10, 2014, Retrieved from the Internet URL: https://play.google.com/store/apps/details?id=com.ubercab&hl=en, on Nov. 12, 2014, pp. 1-2.

Wallen, J., "Five Top Apps for Managing Inventory," Tech Republic, dated Aug. 15, 2012, Retrieved from the Internet URL: http://www.techrepublic.com/blog/five-apps/five-top-apps-for-managing-inventory/, on Nov. 10, 2014, pp. 1-7.

Non-Final Office Action dated Oct. 28, 2014, for U.S. Appl. No. 14/334,422, of Nathoo, A., filed Jul. 17, 2014.

Notice of Allowance dated Feb. 18, 2015, for U.S. Appl. No. 14/334,422, of Nathoo, A., filed Jul. 17, 2014.

Non-Final Office Action dated Mar. 2, 2015, for U.S. Appl. No. 14/177,177, of Brock, Z., et al., filed Feb. 10, 2014.

Final Office Action dated Oct. 19, 2015, for U.S. Appl. No. 14/177,177, of Brock, Z., et al., filed Feb. 10, 2014.

First Examination Report for Australian Patent Application No. 2015289554, dated Feb. 21, 2017.

Examiner Requisition for Canadian Patent Application No. 2,955,452, dated Dec. 29, 2017.

Second Examination Report for Australian Patent Application No. 2015289554, dated Feb. 8, 2018.

Non-Final Office Action dated Feb. 28, 2018, for U.S. Appl. No. 14/754,909, of Tsou, V., filed Jun. 30, 2015.

Final Office Action dated Jul. 16, 2018, for U.S. Appl. No. 14/754,909, of Tsou, V., filed Jun. 30, 2015.

Examiner Requisition for Canadian Patent Application No. 2,955,452, dated Oct. 23, 2018.

International Search Report and Written Opinion for International Application No. PCT/US2015/040800, dated Oct. 30, 2015.

International Search Report and Written Opinion for International Application No. PCT/US2018/018950, dated Apr. 12, 2018.

Examiner Requisition for Canadian Patent Application No. 2,955,452, dated Oct. 7, 2019.

Second Examination Report for Australian Patent Application No. 2018201228, dated Jul. 15, 2019.

Advisory Action dated Sep. 27, 2019, for U.S. Appl. No. 15/476,740, of Ho, V., et al., filed Mar. 31, 2017.

(56) References Cited

OTHER PUBLICATIONS

Final Office Action dated Oct. 17, 2019, for U.S. Appl. No. 14/754,909, of Tsou, V., filed Jun. 30, 2015.
Non-Final Office Action dated Nov. 15, 2019, for U.S. Appl. No. 15/390,119, of Ho, V., et al., filed Dec. 23, 2016.
Final Office Action dated Dec. 13, 2019, for U.S. Appl. No. 16/203,545, of Yien, K., et al., filed Nov. 28, 2017.
Advisory Action dated Dec. 19, 2019, for U.S. Appl. No. 14/754,909, of Tsou, V., filed Jun. 30, 2015.
Non-Final Office Action dated May 30, 2019, for U.S. Appl. No. 14/754,909, of Tsou, V., filed Jun. 30, 2015.
Final Office Action dated Jul. 30, 2019, for U.S. Appl. No. 15/476,740, of Ho, V., et al., filed Mar. 31, 2017.
Notice of Allowance dated Aug. 2, 2019, for U.S. Appl. No. 15/630,769, of Haley, E., tiled Jun. 22, 2017.
Non-Final Office Action dated Aug. 9, 2019, for U.S. Appl. No. 16/203,545, of Yien, K., et al., filed Nov. 28, 2018.

\* cited by examiner

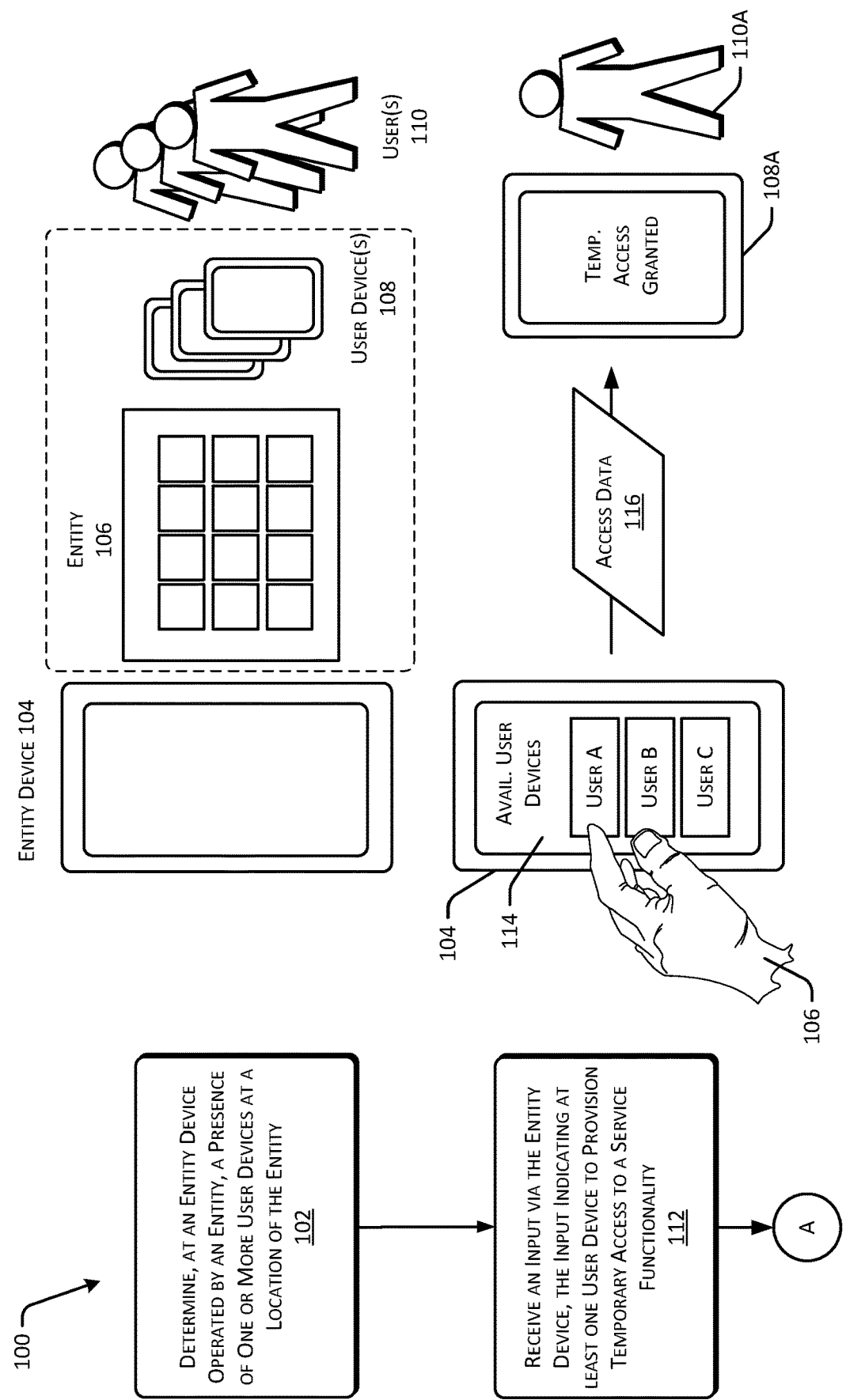

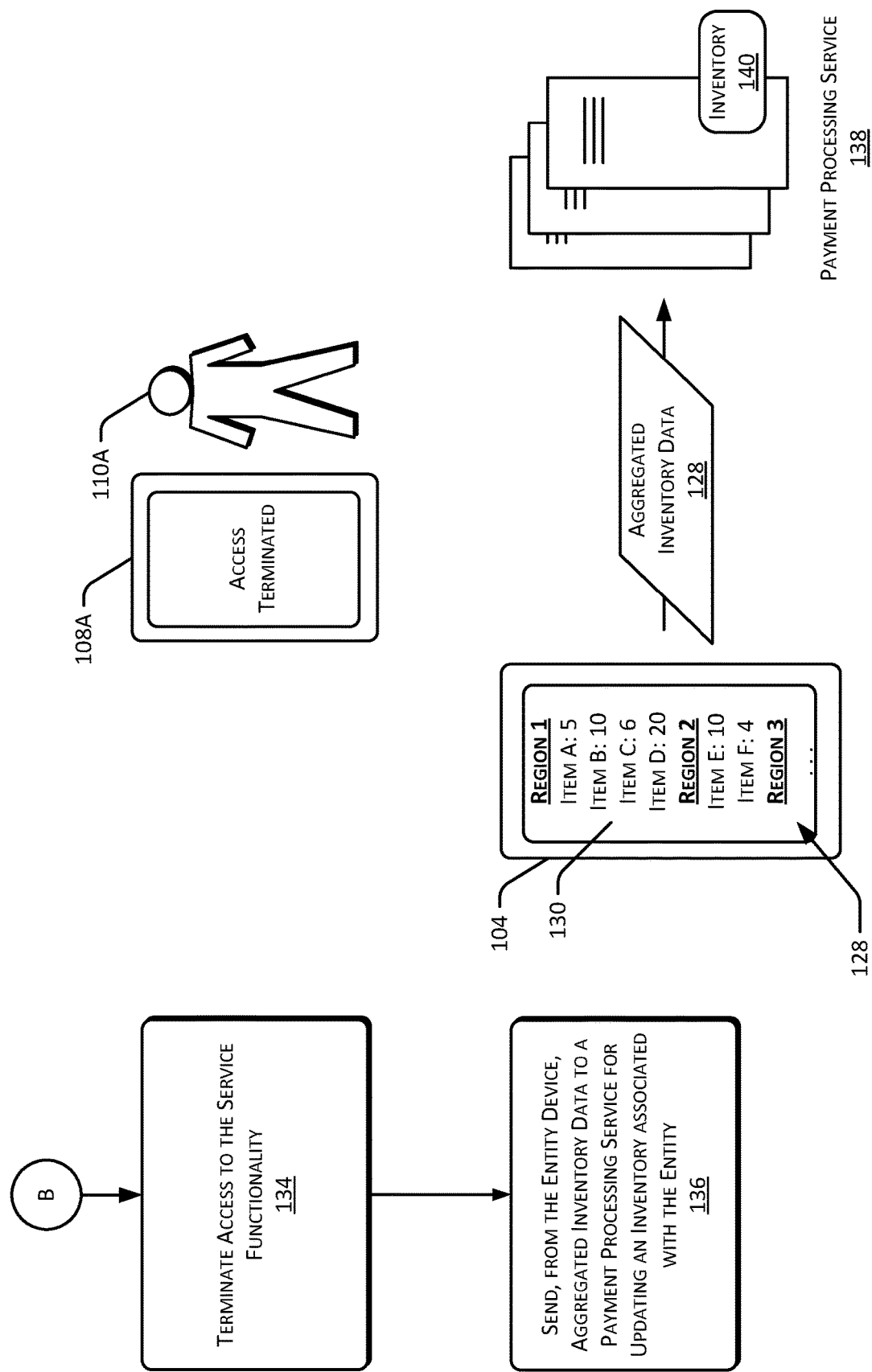

PROVISIONING TEMPORARY FUNCTIONALITY TO USER DEVICES

BACKGROUND

Entities may include merchants, service providers, etc. that offer items (i.e., goods, services, etc.) for acquisition (i.e., sale, rent, lease, etc.) by customers. To understand what items an entity has available for acquisition, the entity may maintain an inventory of the items. In some examples, the entity may accomplish this via a computerized system that tracks inventory and provides point-of-sale functionality. The inventory may indicate a quantity of a particular item the entity has available. In some examples, the computerized system may be used to provide reports regarding sales and inventory. Accordingly, the entity may be able to determine whether it needs to order more of a particular item and/or the entity can understand inventory losses (e.g., due to theft of items, misplacing items, damage to items, etc.).

Current techniques for determining what an entity has in its inventory require the entity (or an agent acting on behalf of the entity) to manually count each item it has on a sales floor or that is otherwise available for acquisition. In some examples, the entity will close physical store(s) early and have its employees manually count each item on the sales floor or that is otherwise available for acquisition. Current techniques are slow and laborious. Furthermore, current techniques are error laden and inaccurate. Accordingly, solutions are needed to streamline inventory data collection.

BRIEF DESCRIPTION OF THE DRAWINGS

The above and other features of the present disclosure, its nature and various advantages, will be more apparent upon consideration of the following detailed description, taken in conjunction with the accompanying drawings in which:

FIG. 1A depicts a portion of an illustrative flow diagram illustrating provisioning temporary service functionality to user devices in accordance with some examples of the present disclosure;

FIG. 1C depicts a portion of the illustrative flow diagram illustrating provisioning temporary service functionality to user devices in accordance with some examples of the present disclosure;

Figure 1B:
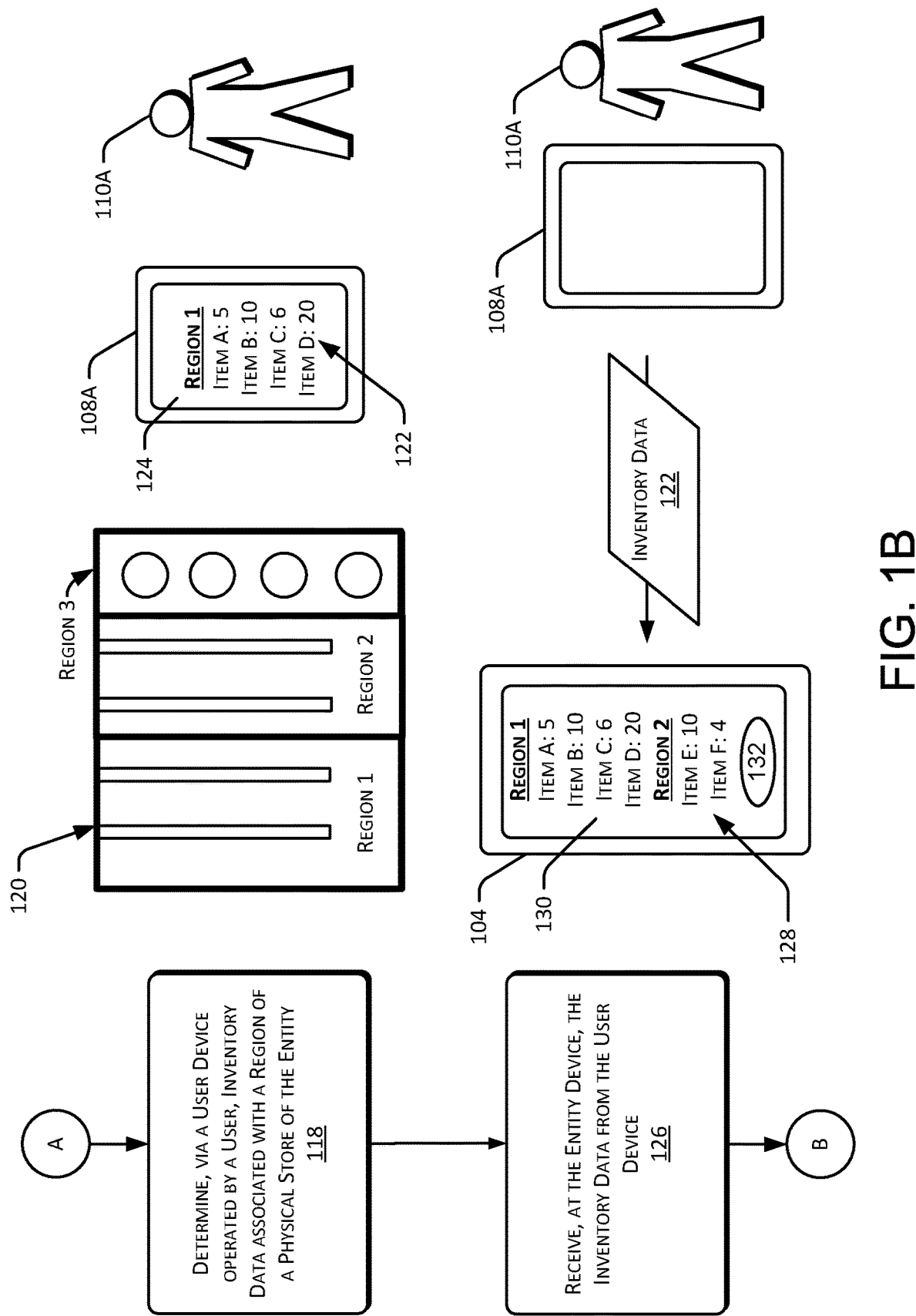
FIG. 1B depicts a portion of the illustrative flow diagram illustrating provisioning temporary service functionality to user devices in accordance with some examples of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A payment processing service may offer a variety of services to help entities, such as merchants, service providers, etc., streamline their businesses. In at least one example, a payment processing service may offer point-of-sale (POS) systems which are associated with various applications associated with the payment processing service that ease POS interactions with customers. A POS system may include a POS terminal and a payment reader. The payment reader may physically interact with payment instruments such as magnetic stripe payment cards, EMV payment cards, and short-range communication (e.g., near field communication (NFC), radio frequency identification (RFID), Bluetooth®, Bluetooth® low energy (BLE), etc.) payment instruments. The POS terminal may provide a rich user interface, communicate with the payment reader, and also communicate with a server associated with the payment processing service. In this manner, the POS terminal and payment reader may collectively process transaction(s) between an entity and customer(s).

In some examples, the payment processing service may additionally and/or alternatively provide tools to enable entities to manage other aspects of their businesses. As an example, the payment processing service may provide tools for maintaining an inventory (i.e., inventory services). That is, the payment processing service may provide an entity with a tool for managing its inventory. In at least one example, the payment processing service may provide inventory tracking and reporting via such a tool.

A tool for managing inventory may enable an entity to access and manage a database storing data associated with a quantity of each item that the entity has available (i.e., an inventory) for acquisition (i.e., sale, rent, lease, etc.). The entity may update the inventory following an inventory data collection activity (as described herein), upon receiving new item(s) that are to be offered for acquisition, after item(s) are acquired by customers, etc. In additional and/or alternative examples, the payment processing service may update the inventory based on information received from the entity and/or other sources and/or systems. For instance, in some examples, the payment processing service may track individual instances of an item as the instance moves through entity(s) associated with a product supply chain. In at least one example, the inventory may include additional information associated with items in the inventory. For instance, data associated with such additional information may include current ownership (i.e., which entity in the product supply chain has the item), location, sale-related events, conditions of items in the inventory, etc.

The payment processing service may provide various access points to an entity so that the entity can access and manage its inventory. As a non-limiting example, the payment processing service may enable an entity to access and manage its inventory via a web interface, a user interface presented via a POS system operated by the entity, etc. In at least one example, the inventory may be useful for generating inventory reports regarding items in the inventory of an entity, loss reports regarding which items in the inventory of the entity have been displaced, etc.

As described above, current techniques for determining which items—and how many of each item type—are in an inventory of an entity may be tedious and error prone.

Techniques described herein are directed to an inventory management tool that enables entities to streamline inventory data collection and management of their inventory. That is, techniques described herein are directed to temporarily provisioning service functionality to user devices and utilizing inventory data determined by the user devices to generate and/or update entity inventories. In at least one example, the user devices may be personal devices. That is, the user devices may be devices that are personal to the user and are not owned and operated by the entity. In at least one example, a device operated by an entity may provide temporary access to the service functionality to a user device. The temporary access may be limited by location, time, user activity, etc.

In at least one example, the user devices may generate inventory data. In some examples, the inventory data may be associated with a particular region of a physical store of an entity. The user devices may send the inventory data to an entity device operated by the entity, which may send the inventory data (e.g., aggregated or otherwise) to a payment processing service. In at least one example, the inventory data may be utilized to update an entity's inventory stored in a database associated with the payment processing service. Additionally and/or alternatively, the inventory data may be useful for providing additional information to the entity. For instance, the inventory data may be useful for locating misplaced items. Or, the inventory data may be useful for determining how to arrange and/or place items in a physical store.

The techniques described herein enhance functionality of personal devices of users. For instance, the techniques described herein enable a secure and automated manner to provide provisioning of temporary access to a service functionality to individual personal devices via a provisioning method that is based on user attributes and location within a physical store of an entity.

While reference is made throughout this disclosure to the temporary provisioning of a service functionality associated with inventory data collection, techniques described herein may be applicable to various other services. For instance, in at least one example, an entity may provide temporary access to POS functionality to enable users to utilize their personal user devices to facilitate transactions between customers and the entity. Such temporary provisioning may be useful during the holiday season or for other special events. Additionally and/or alternatively, an entity may provide temporary access to information about the layout of a physical store to enable users to utilize their personal user devices to organize and/or arrange items in the physical store.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIGS. 1A-1C depict an illustrative flow diagram 100 illustrating provisioning temporary service functionality to user devices in accordance with some examples of the present disclosure.

Block 102 illustrates determining, at an entity device 104 operated by an entity 106, a presence of one or more user devices 108 at a location of the entity 106. In at least one example, the location of the entity 106 may correspond to a physical store of the entity 106. The one or more user devices 108 may be associated with one or more users 110. As described above, in at least one example, the one or more user devices 108 may be personal to the one or more users 110. In at least one example, the entity device 104 may determine a presence of the one or more user devices 108 using various technologies. For instance, in some examples, the entity device 104 may determine a presence of user device(s) 108 based on location data associated with the user device(s) 108. Additionally and/or alternatively, the entity device 104 may determine a presence of user device(s) 108 based on radio signal(s) emitted by the user device(s) 108. Or, in some examples, the entity device 104 may determine a presence of user device(s) 108 based on the user device(s) 108 expressly indicating presence at the location of the entity 106 (e.g., via check-in(s), request(s) for access to functionality associated with an entity, etc.).

Block 112 illustrates receiving an input via the entity device 104, the input indicating at least one user device 108A (corresponding to user 110A) to provision temporary access to a service functionality. In at least one example, the entity device 104 may display a user interface 114 that graphically represents each of the user device(s) 108 that are available for receiving temporary access to the service functionality. For instance, in at least one example, the user interface 114 may graphically represent each of the user devices 108 present at the physical store of the entity 106. The entity 106 (or an agent acting on behalf of the entity 106) may interact with the user interface 114 to select one or more users 110 for provisioning temporary access to the service functionality. As shown, the entity 106 is touching a portion of a touch screen corresponding to user A (e.g., user 110A), thereby indicating its desire to provide temporary access to the service functionality to a corresponding user device 108A. In alternative examples, an entity 106 may provide speech input, gaze input, pointing device/mouse input, etc. The entity 106 may select more than one of the users 110 via the user interface. In some examples, the entity 106 may assign a particular region of a physical store of the entity to each of the users 110. For instance, the entity 106 may assign a first region to user A and a second region to user B, as described below.

Based at least in part on receiving input indicating that the entity 106 desires to temporarily provide access to the service functionality to user device 108A (corresponding to user 110A), the entity device 104 may provide access data 116 to the user device 108A. In some examples, the access data 116 may be associated with a password, code, key, or other unique identifier associated with the entity 106. In at least one example, the user device 108A may store an inventory management application, which is associated with the service functionality. The password, code, key, or other unique identifier may be provided to the inventory management application stored on the user device 108A, and may accordingly enable access to service functionality for the entity 106. In additional and/or alternative examples, the password, code, key, or other unique identifier may be input via a web interface to enable the user device 108A to temporarily access the inventory management application via the web interface. In other examples, the access data 116 may initiate a download of the inventory management application. That is, the access data 116 may initiate a download of the inventory management application on the user device 108A, which may provide the user device 108A with temporary access to the service functionality. In at least one example, the access data 116 may initiate the download of the inventory management application and the user device 108A may download the inventory management application from the entity device 104 and/or a payment processing service. In some examples, the entity device 104 may provide temporary access to the service functionality associated with the inventory management application based on an employment status of a user 110A, a location of the user 110A, a rating associated with the user 110A, etc.

In at least one example, the access data 116 may be associated with data indicating a time interval, the expiration of which causes the termination of the temporary access to the service functionality. In additional and/or alternative examples, the access data 116 may be associated with data indicating a geo-fence (or, geographic location) wherein the temporary access to the service functionality is available. That is, a determination that the user device 108A is outside of the area associated with the geo-fence may cause the termination of the temporary access to the service functionality. In at least one example, the access data 116 may be associated with data indicating a user activity level, the achievement of which causes the termination of the temporary access to the service functionality. For instance, a determination that the user device 108A scanned a predetermined number of item identifiers or attempted a predetermined number of scans may cause the termination of the temporary access to the service functionality.

Block 118 illustrates determining, via a user device 108A operated by a user 110A, inventory data associated with a region of a physical store of the entity 106. A non-limiting example of a plan view 120 of a physical store of the entity 106 is shown as having three regions (e.g., Region 1, Region 2, and Region 3). A physical store of an entity may include more or fewer regions. The regions may include one or more different items. The regions may have a same area or a different area.

A user 110A may utilize its user device 108A to determine inventory data 122 associated with a region of the physical store. For instance, the entity 106 may have provided the user 110A with temporary access to the service functionality while the user device 108A is located within Region 1. That is, a geo-fence may correspond to Region 1, such that if the user device 108A is determined to be outside of Region 1, the user device 108A may not be permitted to access the service functionality.

The user 110A may leverage the service functionality to determine inventory data 122 associated with the Region 1. In some examples, the service functionality may be associated with a scanning functionality, whereby the user device 108A may include a scanning device for reading item identifiers (e.g., barcodes, QR codes, or other unique identifiers) to determine inventory data. In additional and/or alternative examples, the service functionality may be associated with image processing functionality, whereby the user device 108A may process images captured from an image capturing device on the user device 108A and use various image processing techniques to determine inventory data. In at least one example, a user interface 124 may be presented via a display of a user device 108A. The user interface 124 may present inventory data 122 to the user 110A as the user device 108A determines the inventory data 122. User device 108A is shown presenting a non-limiting example of a user interface 124 graphically presenting at least a portion of inventory data 122 associated with Region 1 of the physical store of the entity 106. In at least one example, the user interface 124 may provide the user 110A with functionality to modify and/or supplement the inventory data 122. Furthermore, in some examples, the user interface 124 may provide the user 110A with functionality to specify a condition associated with individual items or provide other information about individual items.

Inventory data may identify a number of items, at least one associated item type, at least one associated item condition, etc. An item type may identify one or more items sharing at least one attribute. For instance, as a non-limiting example, a size medium, red-colored Brand A shirt may be an item type, which may be different from the item type of a size medium, green-colored Brand A shirt. An item condition may describe a condition of an item. For instance, an item may be in excellent condition, good condition, poor condition, damaged, etc. Accordingly, as a non-limiting example, inventory data may indicate that the entity 106 has ten (quantity) size medium, red-colored Brand A shirts (item type) and that each of the ten items may be associated with a condition.

Block 126 illustrates receiving, at the entity device 104, the inventory data 122 from the user device 108A. In at least one example, the user device 108A may send the inventory data 122 to the entity device 104. In some examples, the user device 108A may send the inventory data 122 to the entity device 104 as a data stream. In other examples, the user device 108A may package the inventory data 122 into a data package and may send the data package associated with the inventory data 122 to the entity device 104. In both examples, after the inventory data 122 is sent to the entity device 104, the inventory data 122 is removed from any local storage on the user device 108A.

In at least one example, the entity device 104 may receive inventory data 122 from more than one user device 108A. That is, in at least one example, multiple users 110 and corresponding user devices 108 may perform inventory data collection on behalf of the entity 106. In such an example, each user device 108 may send inventory data 122 to the entity device 104. In some examples, multiple user devices 108 may be assigned to a same region (e.g., Region 1) to generate duplicative inventory data. In other examples, each user device 108 may report inventory data 122 for a different region of the physical store of the entity 106.

The entity device 104 may aggregate the inventory data 122 received from each of the user devices 108 to generate aggregated inventory data 128. In some examples, the entity device 104 may present a user interface 130, which presents a graphical representation of at least a portion of the aggregated inventory data 128. The user interface 130 may provide the entity 106 with the ability to review, modify, supplement, etc. the aggregated inventory data 128. In at least one example, the user interface may 130 include a control 132, the actuation of which indicates that the entity 106 approves of the aggregated inventory data 128 and initiates the transmission of the aggregated inventory data 128 to a payment processing service.

In at least one example, the entity 106 may compensate the user 110A for performing a task utilizing the service functionality. For instance, the user 110A may compensated at a particular rate per hour, rate per region, rate per scan, fixed rate, etc. That is, after receiving inventory data 122 from the user device 108A, the entity 106 may initiate a settling-up process to provide payment to the user 110A. Additionally, in some examples, the entity 106 may rate the user 110A based on his or her performance, efficiency, accuracy, etc. The entity 106 may provide additional and/or alternative feedback as well.

Block 134 illustrates terminating access to the service functionality. Based at least in part on an occurrence of an event, the user device 108A may no longer be able to access the service functionality. In some examples, as described herein, a time period associated with the temporary access may expire. In other examples, the entity device 104 may determine that the user device 108A is outside of a geo-fence associated with the temporary access. In the instant example, the entity device 104 may determine that the user device 108A is outside of Region 1. Accordingly, the entity device 104 may terminate the user device's 108A access to the service functionality.

Block 136 illustrates sending, from the entity device 104, aggregated inventory data 128 to a payment processing service 138 for updating an inventory 140 associated with the entity 106. As described below, the payment processing service 138 may include a database which stores data associated with the inventory of the entity 106 (i.e., inventory 140). The entity device 104 may send the aggregated inventory data 128 to the payment processing service 138 and the payment processing service 138 may update the inventory 140 based on the aggregated inventory data 128.

The user interfaces depicted in FIGS. 1A-1C (e.g., 114, 124, and 130) are non-limiting examples of user interfaces that may be presented for provisioning temporary service functionality to user devices in accordance with some examples of the present disclosure. Additional and/or alternative presentations and/or configurations may be imagined.

Figure 2:
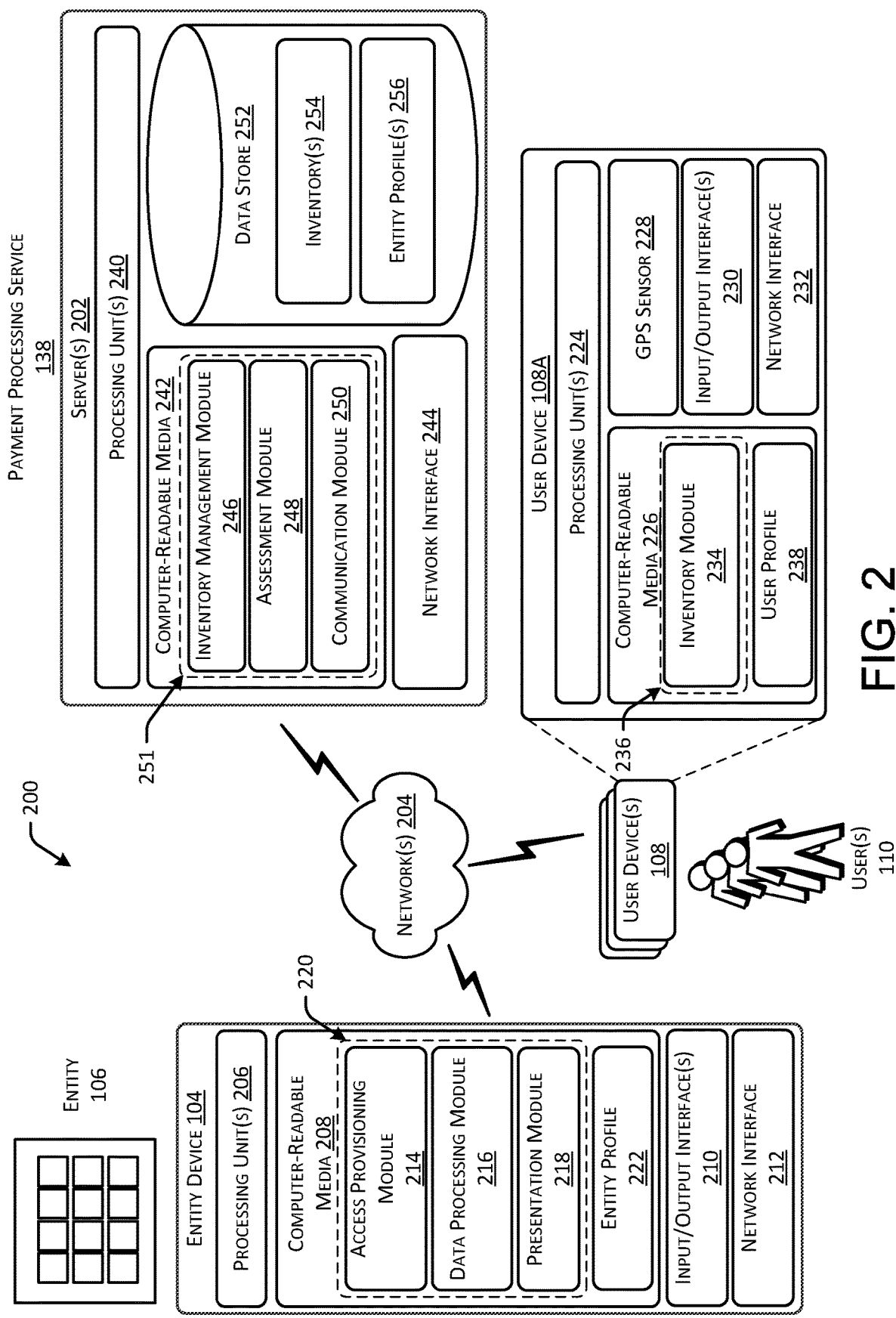
FIG. 2 depicts an illustrative block diagram of an inventory management system in accordance with some examples of the present disclosure.

FIG. 2 depicts an illustrative block diagram of an inventory management system 200 in accordance with some examples of the present disclosure. The inventory management system 200 may include an entity device 104 operated by an entity 106, one or more user devices 108 operated by one or more users 110, and a payment processing service 138. The payment processing service 138 may be associated with one or more servers 202. The entity device 104, one or more user devices 108, and one or more servers 202 may be communicatively coupled via one or more networks 204.

Entity device 104 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. In at least one example, entity device 104 may be a point-of-sale (POS) terminal, which may be connected to a payment reader device. That is, in at least one example, entity device 104 may be associated with a POS system. In such an example, the payment reader device may be capable of accepting a variety of payment instruments, such as credit cards, debit cards, gift cards, short-range communication based payment instruments, and the like. In one example, payment reader device may be a wireless communication device that communicates wirelessly with an interactive electronic device such as entity device 104, for example, using Bluetooth®, BLE, NFC, RFID, etc. In another example, payment reader device may be coupled to an interactive electronic device such as entity device 104, for example, by being insertable into a connector mechanism (e.g., phone jack, headphone jack, etc.) of a smart phone or tablet. That is, in other examples, the payment reader device may be coupled to the entity device 104 via a wired connection. The payment reader device may interact with a payment instrument via a tap, dip, or swipe to obtain payment data associated with a customer.

As described above, an entity 106 may be a merchant, service provider, etc. that offers items for acquisition by customer(s). An item may be a good or a service. A customer may acquire an item by purchasing the item, renting the item, leasing the item, etc. In at least one example, the entity 106 may be associated with one or more agents, such as sales associates, employees, independent contractors, etc., which may interact with entity device 104 on behalf of the entity. The entity (i.e., an agent of the entity) may interact with the entity device 104 to process transactions and/or manage other aspects of the entity's business via tools available by the payment processing service 138.

Entity device 104 may include processing unit(s) 206, computer-readable media 208, input/output interface(s) 210, and a network interface 212. The processing unit(s) 206 of the device 104 may execute one or more modules and/or processes to cause the entity device 104 to perform a variety of functions, as set forth above and explained in further detail in the following disclosure. In some examples, the processing unit(s) 206 may include a central processing unit (CPU), a graphics processing unit (GPU), both CPU and GPU, or other processing units or components known in the art. Additionally, each of the processing unit(s) 206 may possess its own local memory, which also may store program modules, program data, and/or one or more operating systems. Depending on the exact configuration and type of the entity device 104, the computer-readable media 208 may include volatile memory (such as RAM), non-volatile memory (such as ROM, flash memory, miniature hard drive, memory card, or the like), or some combination thereof. In various examples, the entity device 104 may also have input/output interface(s) 210. Examples of input/output interface(s) 210 may include a keyboard, a mouse, a pen, a voice input device, a touch input device, a display, etc.

Furthermore, the entity device 104 may include a network interface 212 for interfacing with the network(s) 204, as described below.

In at least one example, the computer-readable media 208 may include one or more modules for provisioning temporary service functionality to user devices 108 and/or communicating with the payment processing service 138. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 206) to configure the entity device 104 to execute instructions and to perform operations described herein. The module(s) may include an access provisioning module 214, a data processing module 216, and a presentation module 218. In some examples, the access provisioning module 214, the data processing module 216, and the presentation module 218 may be associated with an entity application 220. In at least one example, the computer-readable media 208 may also include an entity profile 222.

The access provisioning module 214 may be configured to provide temporary access to a functionality associated with a service to one or more user devices 108. In at least one example, the service may be associated with inventory data collection, as described above. Alternatively, as described above, the service may be associated with a POS functionality, a store arrangement functionality, etc.

In some examples, the access provisioning module 214 may send data associated with a password, code, key, or other unique identifier associated with the entity 106 to a user device 108A. In at least one example, the user device 108A may store an inventory management application, which is associated with the service functionality. The password, code, key, or other unique identifier may be provided to the inventory management application stored on the user device 108A, and may accordingly enable access to service functionality for the entity 106. In additional and/or alternative examples, the password, code, key, or other unique identifier may be input via a web interface to enable the user device 108A to temporarily access the inventory management application via the web interface. In other examples, the access provisioning module 214 may provide instructions to initiate a download of the inventory management application on the user device 108A, which may provide the user device 108A with temporary access to the service functionality. In some examples, the entity device 104 may provide temporary access to the service functionality associated with the inventory management application based on an employment status of a user 110A, a location of the user 110A, a rating associated with the user 110A, etc.

As described above, in at least one example, the presentation module 218, described below, may cause a user interface that graphically represents each of the user devices 108 that are available for receiving temporary access to the service functionality to be presented via a display of the entity device 104. For instance, in at least one example, the user interface may graphically represent each of the user devices 108 that is present at the physical store of the entity 106. Additionally and/or alternatively, the user interface may graphically represent each of the user devices 108 associated with users 110 having particular employment statuses, ratings, etc. The entity 106 may interact with the user interface to select one or more users 110 for provisioning temporary access to the service functionality, as described above with reference to FIG. 1. Based at least in part on receiving input indicating which users 110 the entity 106 desires to temporarily provide access to the service functionality to, the access provisioning module 214 may provide access to the user devices 108 corresponding to such users 110. In alternative examples, the access provisioning module 214 may provide access to user devices 108 without receiving input from the entity 106. For instance, based at least in part on users 110 and/or user devices 108 having a particular characteristic (e.g., presence at the physical store, a particular employment status, a particular a rating above a threshold, etc.), the access provisioning module 214 may automatically provide access to the user devices 108.

In at least one example, the access provisioned to the user devices 108 may be temporary. In some examples, the temporary access may be associated with a time interval, the expiration of which causes the termination of the temporary access to the service functionality. In additional and/or alternative examples, the temporary access may be associated with a geo-fence (or, geographic location) wherein the temporary access to the service functionality is available. That is, a determination that a particular user device (e.g., user device 108A) is outside of an area associated with the geo-fence may cause the termination of the temporary access to the service functionality. Additionally and/or alternatively, the temporary access may be associated with data indicating a user activity level, the achievement of which causes the termination of the temporary access to the service functionality. For instance, a determination that the user device 108A scanned a predetermined number of item identifiers or attempted a predetermined number of scans may cause the termination of the temporary access to the service functionality.

the temporary access may be associated with user activity level. For instance, a determination that a particular user device (e.g., user device 108A) scanned a predetermined number of item identifiers or attempted a predetermined number of scans may cause the termination of the temporary access to the service functionality.

The data processing module 216 may receive inventory data from individual user devices 108. As described above, inventory data may identify a number of items, at least one associated item type, at least one associated item condition, etc. In at least one example, the inventory data may be associated with additional data indicative of which region of a physical store of an entity 106 the inventory data is associated. In some examples, the user device(s) 108 may send the inventory data to the entity device 104 as a data stream. In other examples, the user device(s) 108 may package the inventory data into a data package and may send the data package associated with the inventory data to the entity device 104.

In at least one example, the data processing module 216 may receive inventory data from each of the user device(s) 108 and may aggregate the inventory data to generate aggregated inventory data. As described above, in some examples, multiple user devices 108 may be assigned to a same region to generate duplicative inventory data. In other examples, each user device 108 may report inventory data 122 for a different region of the physical store of the entity 106.

In examples where more than one of the users 110 determine inventory data for a same region of a physical store of an entity 106, the data processing module 216 may compare the inventory data received from each of the user device(s) 108 assigned to the same region and may determine a similarity value representative of the similarity between the inventory data. For instance, the data processing module 216 may compare a first inventory data received from a first user device with second inventory data received from a second user device. The first inventory data and the second inventory data may be associated with a same region of the physical store of the entity 106. The data processing module 216 may determine a similarity value between the first inventory data and the second inventory data. Based at least in part on determining that the similarity value is less than a threshold value, the data processing module 216 may determine that additional inventory data is needed for the same region of the physical store. Or, in another example, based at least in part on determining that the similarity value is equal to or greater than a threshold value, the data processing module 216 may determine that no additional inventory data is needed for the same region of the physical store.

In some examples, the data processing module 216 may send instructions to the presentation module 218 which instruct the presentation module 218 to present the first inventory data and the second inventory data to the entity 106. The entity 106 may review the first inventory data and the second inventory data to identify and cure any discrepancies. Based at least in part on curing the discrepancies, the entity 106 may approve the first inventory data or the second inventory data, and the data processing module 216 may send the first inventory data or the second inventory data to the payment processing service 138. That is, the data processing module 216 may leverage the first inventory data to supplement the second inventory data or the second inventory data to supplement the first inventory data. The resulting inventory data may correspond to aggregated inventory data that is representative of the region.

In other examples, the data processing module 216 may receive inventory data associated with a same region from three or more user devices 108. In such examples, the data processing module 216 may compare the inventory data received from each of the three or more user devices 108. In at least one example, the data processing module 216 may determine, based at least in part on similarity values, a first inventory data and a second inventory data may be associated with the same or substantially similar inventory data (i.e., similarity values having a difference that is within a range, greater than a threshold, etc.), which is different than a third inventory data (i.e., similarity values having a difference that is outside of a range, less than a threshold, etc.). In such an example, the data processing module 216 may determine that the third inventory data is inaccurate. Accordingly, the data processing module 216 may utilize the inventory data associated with the first inventory data and/or the second inventory data as the inventory data that is representative of the region.

As described above, in some examples, each user device 108 may report inventory data 122 for a different region of the physical store of the entity 106. In such examples, the data processing module 216 may aggregate inventory data from each region to generate aggregated inventory data representative of the entity's 104 inventory.

In some examples, the data processing module 216 may send instructions to the presentation module 218, which instruct the presentation module 218 to present the aggregated inventory data to the entity 106. The entity 106 may review the aggregated inventory data to modify and/or supplement the aggregated inventory data. Then, the entity 106 may approve the aggregated inventory data, and the data processing module 216 may send the aggregated inventory data to the payment processing service 138.

While the preceding paragraphs describe that the data processing module 216 may receive inventory data from one or more user devices 108 and may aggregate the inventory data received from each of the one or more user devices 108, in some examples, the server(s) 202 may receive inventory data from one or more user devices 108 and may aggregate the inventory data received from each of the one or more user devices 108. That is, at least a portion of the functionality performed by the data processing module 216 may be performed by the server(s) 202.

The presentation module 218 may present user interfaces via the entity device 104. In at least one example, various user interfaces may be presented via a display of the device 104. In some examples, the presentation module 218 may receive instructions from the data processing module 216 and may output user interface(s) based on the instructions. In other examples, the presentation module 218 may receive instructions from the payment processing service 138 and may output user interface(s) based on the instructions. That is, the presentation module 224 may be configured to receive instructions from the data processing module 216 and/or the payment processing service 138 and dynamically output and/or update user interface(s) based on the instructions. The presentation module 224 may also receive inputs corresponding to interactions with the various user interface(s) and may send indications of such inputs to the data processing module 216 and/or the payment processing service 138.

The entity profile 222 may store data associated with an entity 106 including, but not limited to, data including information about the entity 106 (e.g., name of the entity, geographic location of the entity, types of goods or services offered by the entity, operating hours of the entity, an entity identifier, an entity category classification, etc.), information about events associated with the entity 106 (e.g., past and upcoming events, dates of events, locations of events, etc.), accounting information associated with the entity 106 (e.g., bank(s) that the entity banks with, etc.), contractual information associated with the entity 106 (e.g., terms of a contract between the entity and the payment service provider), transactional information associated with the entity 106 (e.g., transactions conducted by the entity, goods and/or service associated with the transactions, total spends of each of the transactions, parties to the transactions, dates, times, and/or locations associated with the transactions, etc.), etc. In some examples, at least a portion of the entity profile 222 may be stored in a data store associated with the payment processing service 138.

As described above, entity device 104 may provide temporary access to one or more user devices 108. User device 108A is shown as an example of one of any one of the user devices 108. User device 108A may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. As described above, in at least one example, user device 108A may be personal to a user (e.g., user 110A). That is, in at least one example, user device 108A may be owned and controlled by a corresponding user 110A (instead of owned and/or operated by the entity 106, for example).

User device 108A may include processing unit(s) 224, computer-readable media 226, input/output interface(s) 230, and a network interface 232. The processing unit(s) 224 of the device 104 may execute one or more modules and/or processes to cause the user device 108A to perform a variety of functions, as set forth above and explained in further detail in the following disclosure. In some examples, the processing unit(s) 224 may include a CPU, a GPU, both CPU and GPU, or other processing units or components known in the art. Additionally, each of the processing unit(s) 224 may possess its own local memory, which also may store program modules, program data, and/or one or more operating systems. Depending on the exact configuration and type of the user device 108A, the computer-readable media 226 may include volatile memory (such as RAM), non-volatile memory (such as ROM, flash memory, miniature hard drive, memory card, or the like), or some combination thereof. The user device 108A may include a GPS sensor 228, for receiving geolocation and time information (i.e., location data) associated with the user device 108A. In various examples, the user device 108A may also have input/output interface(s) 230. Examples of input/output interface(s) 230 may include a keyboard, a mouse, a pen, a voice input device, a touch input device, a display, a camera, a scanner, a clock, a timer, etc. Furthermore, the user device 108A may include a network interface 232 for interfacing with the network(s) 204, as described below.

In at least one example, the computer-readable media 226 may include one or more modules for accessing and utilizing temporarily provisioned service functionality. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 224) to configure the user device 108A to execute instructions and to perform operations described herein. The module(s) may include an inventory module 234, which may be associated with an inventory management application 236. As described above, in some examples, the inventory management application 236 may be stored on the user device 108A. In other examples, the inventory management application 236 may be downloaded from the entity device 104 and/or the payment processing service 138. In at least one example, the computer-readable media 226 may also include a user profile 238.

The inventory module 234 may determine inventory data. The inventory module 234 may be associated with the service functionality to determine inventory data. In some examples, the service functionality may be associated with a scanning functionality, whereby the inventory module 234 receives data from a scanning device (e.g., an input/output interface 230) associated with the user device 108A. In at least one example, the scanning device may be an image scanner, which captures an image of an item identifier, such as a barcode, QR code, or other unique identifier. The inventory module 234 may include image processing capabilities to analyze such image(s), identify the barcode, QR code, or other unique identifier. The inventory module 234 may receive image data from an image scanner and may perform image processing on the image data to determine an identity of the corresponding item based on the barcode, QR code, or other unique identifier. In some examples, an image may include more than one barcode, QR code, or other unique identifier. In a non-limiting example, the inventory module 234 may determine that there are five instances of a particular barcode in an image and accordingly, may determine that there are five items of an item type corresponding to the barcode. The barcode may be mapped to a particular item type in the inventory, described below. As such, the inventory module 234 may determine inventory data indicating that there are five items of the particular item type in the inventory of the entity 106.

As described above, in some examples the inventory module 234 may include image processing capabilities. In at least one example, the inventory module 234 may receive an image from an image capturing device associated with the user device 108A. In an example, the inventory module 234 may utilize various image analysis techniques (e.g., two-dimensional and/or three-dimensional object recognition, image segmentation, etc.) to identify items in the image. Inventory data may be determined based on item(s) identified in an image. As an example, the inventory module 234 may use the various image processing techniques to determine that there are ten instances of a first item and seven instances of a second item depicted in an image. Accordingly, the inventory module 234 may determine inventory data indicating that there are ten first items and seven second items in the inventory of the entity 106.

In at least one example, the inventory module 234 may cause a user interface to be presented via a display of a user device 108A. The user interface may present inventory data to the user 110A as the inventory module 234 determines the inventory data. In at least one example, the user interface may provide the user 110A with functionality to modify and/or supplement the inventory data 122. Furthermore, in some examples, the user interface may provide the user 110A with functionality to specify a condition associated with individual items or provide other information about individual items. In at least one example, the user interface may provide the user 110A with functionality to indicate that a barcode, QR code, or other unique identifier is not readable.

The user profile 232 may store data associated with a corresponding user (e.g., user 110A). The data may indicate a rating associated with a user 110A, a rate associated with the user 110A (e.g., how much the user requires in compensation to complete a task), an experience level of the user 110A, preferences of the user 110A, a location of the user 110A, etc. In at least one example, the user profile 232 may indicate an employment status associated with a user 110A.

For the purpose of this discussion, an employment status may indicate whether a user 110A is a fulltime employee, a part-time employee, a temporary employee, an independent contractor, etc. Moreover, an employment status may indicate a length of time associated with the employment status, a scope of duties associated with the employment status, etc.

As described above, the payment processing service 138 may include one or more servers 202. The server(s) 202 may include processing unit(s) 240, computer-readable media 242, and a network interface 244. The processing unit(s) 240 of the server(s) 202 may execute one or more modules and/or processes to cause the server(s) 202 to perform a variety of functions, as set forth above and explained in further detail in the following disclosure. In some examples, the processing unit(s) 240 may include a CPU, a GPU, both CPU and GPU, or other processing units or components known in the art. Additionally, each of the processing unit(s) 240 may possess its own local memory, which also may store program modules, program data, and/or one or more operating systems. Depending on the exact configuration and type of the server(s) 202, the computer-readable media 242 may include volatile memory (such as RAM), non-volatile memory (such as ROM, flash memory, miniature hard drive, memory card, or the like), or some combination thereof. The server(s) 202 may include a network interface 244 for interfacing with the network(s) 204, as described below.

In at least one example, the computer-readable media 242 may include one or more modules for facilitating computerized inventory management. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 240) to configure the server(s) 202 to execute instructions and to perform operations described herein. The module(s) may include an inventory management module 246, an assessment module 248, and a communication module 250. In some examples, the inventory management module 246, the assessment module 248, and the communication module 250 may be associated with a server-side application 251. The server(s) 202 may also include a data store 252, may be configured to store data so that it may be accessible, manageable, and updatable. The data store 252 may store inventory(s) 254 and entity profile(s) 256.

The inventory management module 246 may manage inventory(s) 254 stored in the data store 252. That is, in at least one example, the inventory management module 246 may receive instructions associated with modifying inventory(s) and may update respective inventory(s) based on the instructions. In some examples, the instructions may be associated with inventory data (e.g., aggregated inventory data or otherwise). For instance, entity device 104 may send instructions to the payment processing service 138 which may include aggregated inventory data, and responsive to receiving the instructions and the aggregated inventory data, the inventory management module 236 may modify the inventory associated with the entity 106 to reflect the aggregated inventory data.

The assessment module 248 may access inventory data associated with an entity and may determine information from the inventory data. In at least one example, the assessment module 248 may access recently received inventory data (e.g., aggregated inventory data or otherwise) and previously determined inventory data (e.g., aggregated inventory data or otherwise). The assessment module 248 may determine a similarity value between the recently received inventory data and the previously determined inventory data. Based at least in part on determining that the similarity value is less than a threshold value, the assessment module 248 may determine that additional inventory data is needed. That is, the assessment module 248 may determine that the recently received inventory data and the previously determined inventory data are too dissimilar such that additional inventory data is needed to determine whether the recently received inventory data is accurate. Or, based at least in part on determining that the similarity value is equal to or greater than a threshold value, the assessment module 248 may determine that no additional inventory data is needed. That is, the assessment module 248 may determine that the recently received inventory data and the previously determined inventory data is similar enough to indicate that the recently received inventory data is accurate.

The assessment module 248 may perform additional and/or alternative data comparisons utilizing inventory data. For instance, in some examples the assessment module 248 may access recently received inventory data (e.g., aggregated inventory data or otherwise) and sales data associated with the entity 106. In at least one example, the sales data may be accessible from an entity profile 256 associated with the entity 106. The assessment module 248 may determine a similarity value between the recently received inventory data and the sales data. Based at least in part on determining that the similarity value is less than a threshold value, the assessment module 248 may determine that additional inventory data is needed. That is, the assessment module 248 may determine that the recently received inventory data and the sales data are too dissimilar such that additional inventory data is needed to determine whether the recently received inventory data is accurate. Or, based at least in part on determining that the similarity value is equal to or greater than a threshold value, the assessment module 248 may determine that no additional inventory data is needed. That is, the assessment module 248 may determine that the recently received inventory data and the sales data is similar enough to indicate that the recently received inventory data is accurate.

The communication module 250 may send instructions to the entity device 104 for communicating information via the entity device 104. For instance, the communication module 250 may send instructions associated with an indication that additional inventory data is needed. As described above, the assessment module 248 may determine that additional inventory data is needed and in such examples, the communication module 250 may send instructions associated with an indication that is to be presented via the entity device 104. In other examples, the communication module 250 may send instructions associated with an indication that an inventory 254 has been updated. In some examples and responsive to the entity device 104 initiating a download of an inventory management application on the user device 108A, the communication module 250 may send at least a portion of the inventory management application to the user device 108A.

As described above, the data store 252 may store inventory(s) and entity profile(s) 256. The inventory(s) 254 may be associated with a database storing one or more inventories. As described above, an entity 106 may be associated with an inventory, such as inventory 140 described above with reference to FIG. 1. An inventory may enable an entity 106 to know the quantity of each item type that the entity has available at a particular time. The inventory(s) 254 may be arranged by entity 106, such that each entity 106 is associated with an entity identifier and data associated with a corresponding inventory is mapped to the entity identifier. As described above, an inventory associated with an entity 106 may include data associated with item(s) that an entity 106 has available for acquisition, a quantity associated with each item type, a condition associated with individual items, current ownership (i.e., which entity in the product supply chain has the item) of individual items, locations of individual items, sale-related events of individual items, etc. In an example, the inventory may include a plurality of data entries that are mapped to an entity identifier. Each data entry may correspond to an item type and data indicating quantity and additional information may be mapped to the data entry corresponding to the item type. As described above, upon receiving inventory data (e.g., aggregated inventory data or otherwise) associated with an update to the inventory of the entity 106, the inventory management module 246 may update the inventory to reflect the inventory data.

The entity profile(s) 256 may be associated with a database storing one or more entity profiles. As described above, an entity 106 may be associated with an entity profile. An entity profile may store data associated with an entity 106 including, but not limited to, data including information about the entity 106 (e.g., name of the entity, geographic location of the entity, types of goods or services offered by the entity, operating hours of the entity, an entity identifier, an entity category classification, etc.), information about events associated with the entity 106 (e.g., past and upcoming events, dates of events, locations of events, etc.), accounting information associated with the entity 106 (e.g., bank(s) that the entity banks with, etc.), contractual information associated with the entity 106 (e.g., terms of a contract between the entity and the payment service provider), transactional information associated with the entity 106 (e.g., transactions conducted by the entity, goods and/or service associated with the transactions, total spends of each of the transactions, parties to the transactions, dates, times, and/or locations associated with the transactions, etc.), etc. In some examples, at least a portion of an entity profile may be stored on a device associated with an entity (e.g., entity device 104).

Network(s) 204 may be any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 204 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, the entity device 104, user device(s) 108, and/or the payment processing service 138 may communicatively couple to network(s) 204 in any manner, such as by a wired or wireless connection. Network(s) 204 may also facilitate communication between the entity device 104, user device(s) 108, and the payment processing service 138. In turn, network interfaces (e.g., network interface 212, network interface 232, and network interface 244) may be any network interface hardware components that may allow the entity device 104, user device(s) 108, and/or the server(s) 202 to communicate over the network(s) 204.

Figure 3:
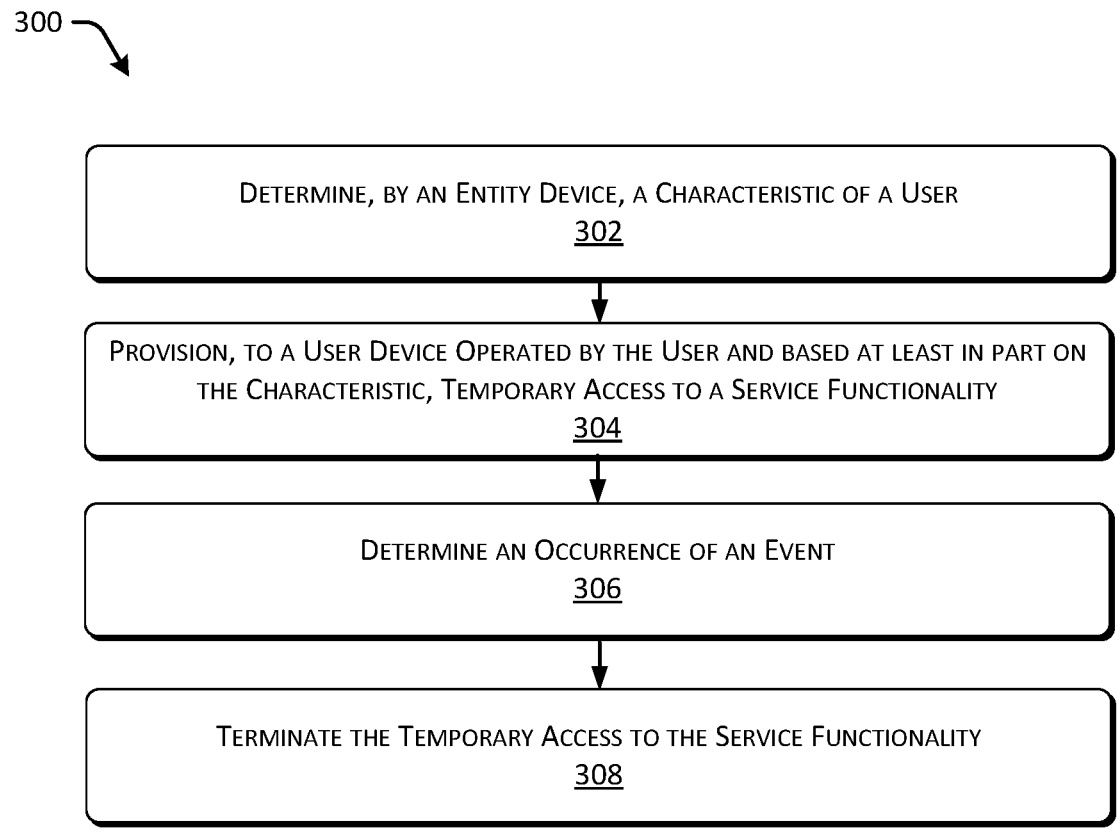
FIG. 3 depicts a non-limiting flow diagram illustrating a method for provisioning temporary service functionality to user devices in accordance with some examples of the present disclosure.

FIG. 3 depicts a non-limiting flow diagram illustrating a method 300 for provisioning temporary service functionality to user devices in accordance with some examples of the present disclosure. FIG. 3 is described in the environment of FIG. 2; however, FIG. 3 is not limited to such an environment.

Block 302 illustrates determining, by an entity device 104, a characteristic of a user (e.g., user 110A). In at least one example, the access provisioning module 214 may determine a characteristic of a user 110A. The characteristic may be a location of the user 110A, an employment status of the user 110A, a rating of the user 110A, etc.

In some examples, the characteristic may be a location of the user 110A. In at least one example, the access provisioning module 214 may determine the location a user device 108A operated by the user 110A using various technologies. For instance, in some examples, the access provisioning module 214 may determine the location of the user device 108A based on location data associated with the user device 108A. That is, location data associated with a user device 108A may indicate where the user device 108A is located. Additionally and/or alternatively, the access provisioning module 214 may determine the location of user device 108 based on a radio signal emitted by the user device 108A. For instance, the access provisioning module 214 may determine that a strength of a radio signal emitted from a user device 108A exceeds a threshold indicating that the user device 108A is located at a physical store associated with the entity 106. Or, in some examples, the access provisioning module 214 may determine the location of a user device 108A based on the user device 108A expressly indicating a presence at a physical store of the entity 106 (e.g., via a check-in, a request for access to functionality associated with an entity, etc.). In some examples, the characteristic may be a location of the user 110A corresponding to a physical store of the entity 106. In such examples, the access provisioning module 214 may leverage the location of the user device 108A corresponding to the user 110A to determine whether the user device 108A is located at or within a threshold distance of the physical store of the entity 106.

Additionally and/or alternatively, the characteristic may be an employment status of the user 110A. For instance, the access provisioning module 108A may receive data indicating the employment status of the user 110A. The data may indicate that the user 110A is employed by the entity 104 for a period of time and/or a particular task (e.g., inventory data collection). Or, the data may indicate that the user 110A is an independent contractor of the entity 104 for a period of time and/or a particular task (e.g., inventory data collection). In some examples, the data may be received from the user device 108A operated by the user 110A. In other examples, the data may be accessible via the entity device 104. In yet additional and/or alternative examples, the data may be received from third party sources or systems.

In at least one example, the characteristic may be a rating of the user 110A. For instance, in some examples, entities (e.g., entity 106) may rate a user 110A following the completion of a task. A rating of a user 110A may be associated with a user profile associated with the user 110A. In some examples, the data may be received from the user device 108A operated by the user 110A. In other examples, the data may be accessible via the entity device 104. In yet additional and/or alternative examples, the data may be received from third party sources or systems. Additional and/or alternative characteristics may be imagined.

Block 304 illustrates provisioning, to a user device (e.g., user device 108A) operated by the user 110A and based at least in part on the characteristic, temporary access to a functionality associated with a service. In at least one example, the access provisioning module 214 may leverage characteristic(s) to determine whether to provide temporary access to a functionality associated with a service. In additional and/or alternative examples, the access provisioning module 214 may receive input from the entity 106 instructing the access provisioning module 214 to provide access to the user device 108A. As described above, the functionality associated with the service may be an inventory data collection functionality associated with an inventory service. Or, the functionality associated with the service may be a POS functionality associated with a payment processing service. Additional and/or alternative functionality(s) associated with service(s) may be imagined.

In an example, the access provisioning module 214 may provide temporary access to a functionality associated with a service to a user device 108A based on determining that the user device 108A is present at a physical store of the entity 106. In an additional and/or alternative examples, the access provisioning module 214 may provide access to user(s) 110 associated with some employment statuses but may not provide access to user(s) 110 associated with other employment statuses. For instance, based at least in part on determining that a user 110A is an employee and/or independent contractor for the entity 106 at a particular time, the access provisioning module 214 may provide temporary access to a functionality associated with a service to a user device 108A operated by the user 110A. Moreover, the access provisioning module 214 may provide access to user(s) 110 associated with some rankings but may not provide access to user(s) 110 associated with other rankings. For instance, the access provisioning module 214 may provide access to user(s) 110 associated with ranking(s) above a threshold ranking but may not provide access to user(s) 110 associated ranking(s) below the threshold ranking. For instance, based at least in part on determining that a user 110A is associated with a ranking above the threshold, the access provisioning module 214 may provide temporary access to a functionality associated with a service to a user device 108A operated by the user 110A.

In at least one example, the access provisioning module 214 may surface graphical representation(s) of user device(s) 108 that have particular characteristics and may receive input from the entity 106 instructing the access provisioning module 214 to provide access to particular user device(s) 108.

As described above, in some examples, the access provisioning module 214 may send data associated with a password, code, key, or other unique identifier associated with the entity 106 to a user device 108A. An application on the user device 108A may utilize the password, code, key, or other unique identifier to enable the user device 108A to have temporary access to functionality associated with a service. In additional and/or alternative examples, the password, code, key, or other unique identifier may be input via a web interface to enable the user device 108A to temporarily access the functionality associated with a service via the web interface. In other examples, the access provisioning module 214 may provide instructions to initiate a download of the application on the user device 108A, which may provide the user device 108A with temporary access to functionality associated with a service.

Block 306 illustrates determining an occurrence of an event. In at least one example, the access provisioning module 214 may determine an occurrence of an event. The event may correspond to the expiration of a time period, a determination that the user device 108A is outside of a particular geo-fence, a determination that the user device 108A engaged in particular user activity, etc. As described above, in at least one example, the temporary access to the service functionality may be associated with a time period, the expiration of which terminates the temporary access. In an additional and/or alternative example, the temporary access to the service functionality may be associated with a geo-fence. In such an example, a determination that a user device 108A is outside of the geo-fence may terminate the temporary access. In at least one example, the temporary access to the service functionality may provided based on user activity level. In such an example, a determination that a user device 108A scanned a predetermined number of item identifiers or attempted a predetermined number of scans may cause the termination of the temporary access to the service functionality. The access provisioning module 214 may determine the expiration of the time period, that the user device 108A is outside of a geo-fence, that the user device 108A engaged in the particular user activity, etc.

Block 308 illustrates terminating the temporary access to the service functionality. Based at least in part on determining the occurrence of the event, the access provisioning module 214 may terminate the access to the service functionality. In such examples, the access provisioning module 214 may send instructions to the user device 110 instructing the application associated with the service functionality to terminate future access to the service functionality.

In at least one example, a user 110A may request, via a user device 108A, access to the service functionality after the termination of previous access to the service functionality. For instance, in a non-limiting example, the entity device 104 may provision the user device 108A with temporary access to the service functionality while the user device 108A is in a first region. That is, the user device 108A may be assigned to the first region to determine inventory data associated with the first region. Once the user device 108A is determined to be outside of the first region, the user device 108A may be prohibited from accessing the service functionality. However, the user device 108A may request to access the service functionality to determine inventory data for a second region. Accordingly, the entity device 104 may again provision temporary access to the service functionality while the user device 108A is in the second region. That is, the user device 108A may utilize the service functionality while the user device 108A is in the second region. In a similar fashion, a user device 108A may request access to the service functionality after expiration of a predetermined period of time.

Figure 4:
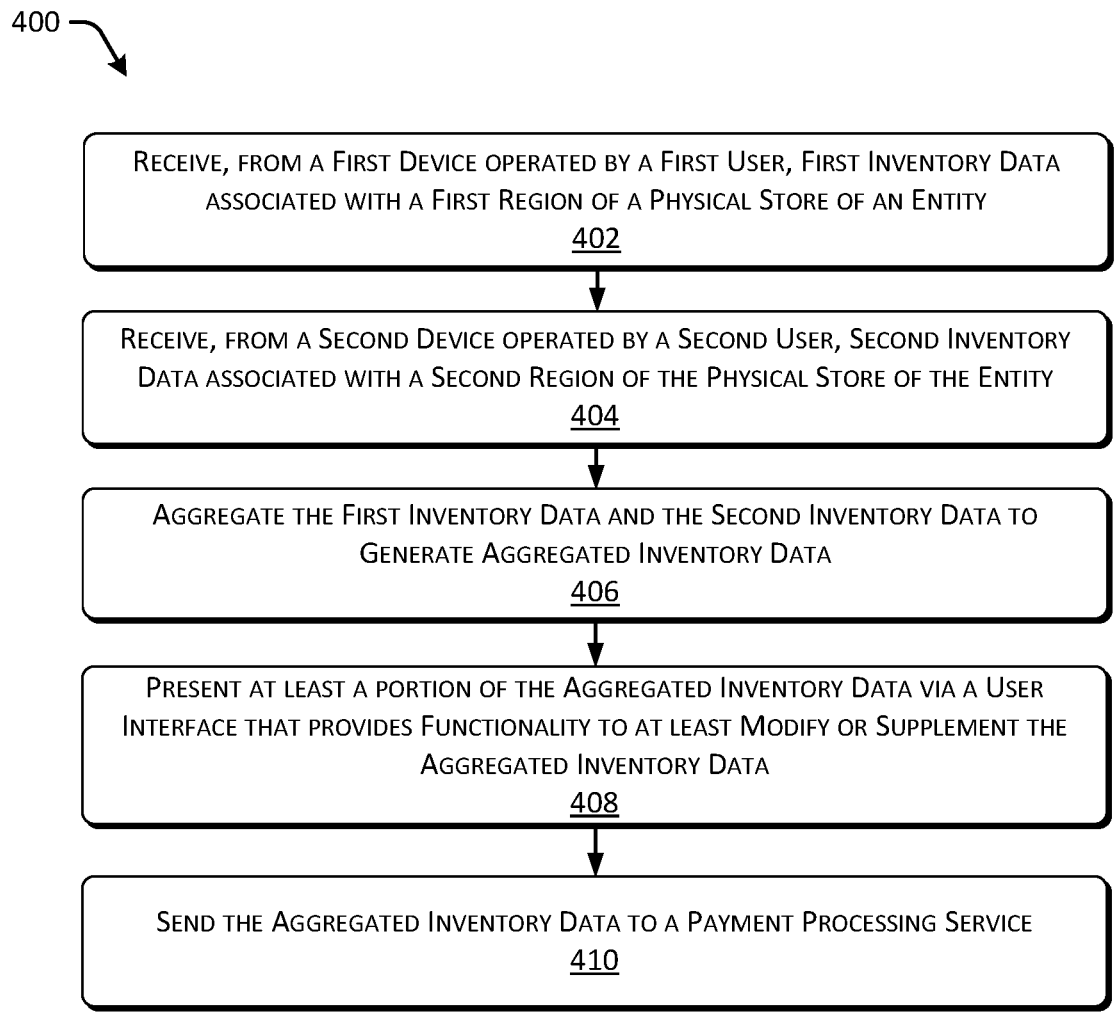
FIG. 4 depicts a non-limiting flow diagram illustrating a method for generating aggregated inventory data and providing the aggregated inventory data to a payment processing service in accordance with some examples of the present disclosure.

FIG. 4 depicts a non-limiting flow diagram illustrating a method 400 for generating aggregated inventory data and providing the aggregated inventory data to a payment processing service in accordance with some examples of the present disclosure. FIG. 4 is described in the environment of FIG. 2; however, FIG. 4 is not limited to such an environment.

Block 402 illustrates receiving, from a first user device (e.g., user device 108A) operated by a first user (e.g., user 110A), first inventory data associated with a first region of a physical store of an entity 106. As described above, the data processing module 216 may receive inventory data from one or more user devices 108. The data processing module 216 may receive first inventory data from a first user device (e.g., user device 108A).

Block 404 illustrates receiving, from a second user device operated by a second user, second inventory data associated with a second region of the physical store of the entity 106. The data processing module 216 may receive second inventory data from a second user device. The second inventory data may be associated with a second region of the physical store of the entity 106. In some examples, multiple user devices 108 may be assigned to a same region to generate duplicative inventory data. That is, in such examples, the first inventory data and the second inventory data are associated with a same region. In other examples, a first user device (e.g., user device 108A) may be assigned to a first region of the physical store and a second user device may be assigned to a second region of the physical store. That is, in such examples, the first inventory data and the second inventory data are associated with different regions.

Block 406 illustrates aggregating the first inventory data and the second inventory data to generate aggregated inventory data. The data processing module 216 may aggregate the first inventory data and the second inventory data to generate aggregated inventory data.

As described above, in some examples, multiple user devices 108 may be assigned to a same region to generate duplicative inventory data for the region. In such examples, the data processing module 216 may compare the inventory data received from each of the user device(s) 108 assigned to the same region and may determine a similarity value representative of the similarity between the inventory data. For instance, if the first region and the second region are a same region, the data processing module 216 may compare the first inventory data with the second inventory data. The data processing module 216 may determine a similarity value between the first inventory data and the second inventory data. Based at least in part on determining that the similarity value is less than a threshold value, the data processing module 216 may determine that additional inventory data is needed for the same region of the physical store. Or, in another example, based at least in part on determining that the similarity value is equal to or greater than a threshold value, the data processing module 216 may determine that no additional inventory data is needed for the same region of the physical store.

In at least one example, if additional inventory data is not needed, the data processing module 216 may leverage the first inventory data to supplement the second inventory data or the second inventory data to supplement the first inventory data. In some examples, the data processing module 216 may compare data corresponding to a same item and/or same item type to ensure that the first inventory data and the second inventory data are associated with the same data. In the event that there is a conflict (e.g., the first inventory data and the second inventory data corresponding to a same item and/or same item type are associated with different data), the data processing module 216 may send instructions to the presentation module 218 instructing the presentation module 218 to surface the conflict via a user interface. In such an example, the entity 106 may review the conflict and may resolve the conflict by providing input.

In additional and/or alternative examples, the data processing module 216 may send instructions to the presentation module 218, which instruct the presentation module 218 to present the first inventory data and the second inventory data to the entity 106. The entity 106 may review the first inventory data and the second inventory data and may provide input to cure any discrepancies. The resulting inventory data may correspond to aggregated inventory data.

In an example where individual user devices 108 are assigned to different regions of the physical store of the entity 106, the data processing module 216 may receive inventory data from each of the devices 108 and may aggregate the inventory data to generate aggregated inventory data. In some examples, the aggregated inventory data may be representative of the complete inventory of the physical store of the entity 106. In other examples, the aggregated inventory data may be representative of a portion of the inventory of the physical store of the entity 106.

Block 408 illustrates presenting at least a portion of the aggregated inventory data via a user interface that provides functionality to at least modify or supplement the aggregated inventory data. The presentation module 218 may receive instructions for surfacing the aggregated inventory data. That is, the data processing module 216 may instruct the presentation module 218 to present at least a portion of the aggregated inventory data. Accordingly, the presentation module 218 may present a user interface that graphically presents at least a portion of the aggregated inventory data. The user interface may provide the entity 106 with the ability to review the aggregated inventory data and modify or supplement various aspects of the aggregated inventory data.

Block 410 illustrates sending the aggregated inventory data to a payment processing service 138. In at least one example, the data processing module 216 may send the aggregated inventory data to the payment processing service 138. In some examples, the data processing module 216 may send aggregated inventory data without receiving input from the entity 106. In other examples, the presentation module 218 may present a user interface that enables the entity 106 to approve the aggregated inventory data, as described above. In such examples, the user interface may enable the entity 106 to interact with a control or other mechanism to indicate that it approves the aggregated inventory data, and based on receiving such an indication, the data processing module 216 may send the aggregated inventory data to the payment processing service 138.

As described above, in some examples, the data processing module 216 may receive inventory data associated with more than one region of a physical store of the entity. In at least one example, the data processing module 216 may receive inventory data associated with all regions of the physical store of the entity 106 within a threshold period of time. In such an example, the data processing module 216 may aggregate the inventory data and send the inventory data to the payment processing service 138 as described above. In other examples, the data processing module 216 may receive inventory data associated with all regions of the physical store of the entity 106 at different times that are not within a threshold period of time. In such examples, the data processing module 216 may refrain from aggregating the inventory data until inventory data associated with all regions is received. Or, the data processing module 216 may aggregate inventory data that has been received and send such aggregated inventory data to the payment processing service 138. That is, in some examples, the aggregated inventory data that may be sent to the payment processing service 138 may not be representative of the complete inventory of the physical store of the entity 106.

While the preceding paragraphs describe that the data processing module 216 may receive inventory data from one or more user devices 108 and may aggregate the inventory data received from each of the one or more user devices 108, in some examples, the server(s) 202 may receive inventory data from one or more user devices 108 and may aggregate the inventory data received from each of the one or more user devices 108. That is, at least a portion of the functionality performed by the data processing module 216 may be performed by the server(s) 202.

Figure 5:
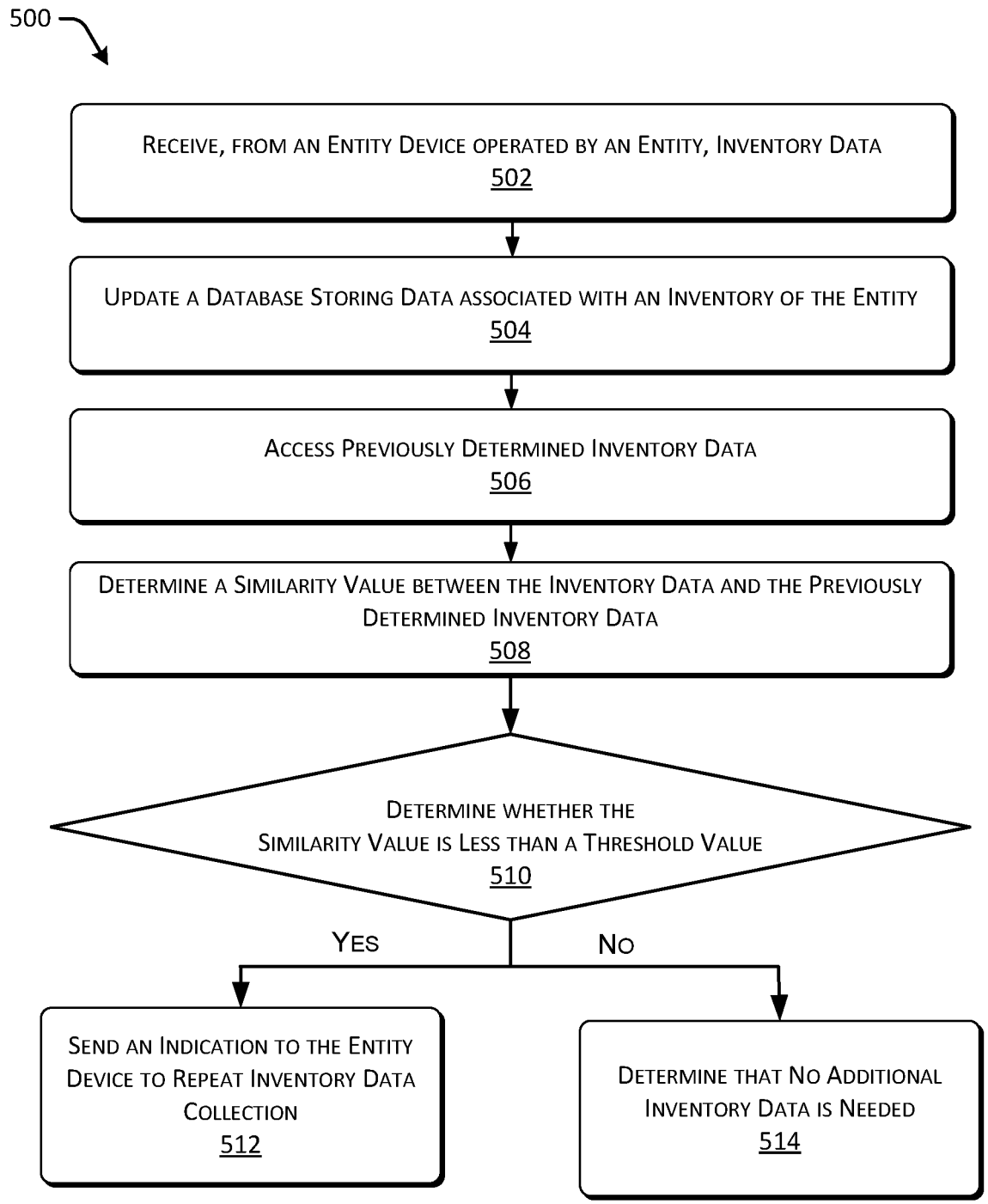
FIG. 5 depicts a non-limiting flow diagram illustrating a method for assessing data in accordance with some examples of the present disclosure.

FIG. 5 depicts a non-limiting flow diagram illustrating a method 500 for assessing aggregated data in accordance with some examples of the present disclosure. FIG. 5 is described in the environment of FIG. 2; however, FIG. 5 is not limited to such an environment.

Block 502 illustrates receiving, from an entity device 104 operated by an entity 106, inventory data. As described above, the inventory management module 246 may manage inventory(s) 254 stored in the data store 252. That is, in at least one example, the inventory management module 246 may receive instructions associated with modifying inventory(s) and may update respective inventory(s) based on the instructions. In some examples, the instructions may be associated with inventory data (e.g., aggregated inventory data or otherwise). For instance, entity device 104 may send instructions to the payment processing service 138 which may include aggregated inventory data, and responsive to receiving the instructions and the aggregated inventory data, the inventory management module 236 may modify the inventory associated with the entity 106 to reflect the aggregated inventory data, as illustrated in block 504.

Block 506 illustrates accessing previously determined inventory data. In at least one example, the assessment module 248 may access previously determined inventory data. The previously determined inventory data may or may not be aggregated inventory data, but may correspond to the recently received inventory data. That is, if the recently received inventory data is aggregated inventory data, the assessment module 248 may access previously received aggregated inventory data. Or, if the recently received inventory data is inventory data associated with a single region, the assessment module 248 may access previously determined inventory data associated with the same single region. The assessment module 248 may access the previously determined inventory data from the inventory(s) 254.

Block 508 illustrates determining a similarity value between the inventory data and the previously determined inventory data. In at least one example, the assessment module 248 may access the recently received inventory data (e.g., aggregated inventory data or otherwise) and previously determined inventory data (e.g., aggregated inventory data or otherwise). The assessment module 248 may compare the recently received inventory data and the previously determined inventory data to determine a similarity value, as described above. The similarity value may represent a degree of similarity between the recently received inventory data and the previously determined inventory data.

Block 510 illustrates determining whether the similarity value is less than a threshold value. The assessment module 248 may determine whether the similarity value is less than a threshold value.

Block 512 illustrates sending an indication to the entity device 104 to repeat inventory data collection. Based at least in part on determining that the similarity value is less than a threshold value, the assessment module 248 may determine that additional inventory data is needed. That is, the assessment module 248 may determine that the recently received inventory data and the previously determined inventory data are too dissimilar such that additional inventory data is needed to determine whether the recently received inventory data is accurate.

Block 514 illustrates determining that no additional inventory data is needed. In an alternative example, based at least in part on determining that the similarity value is equal to or greater than a threshold value, the assessment module 248 may determine that no additional inventory data is needed. That is, the assessment module 248 may determine that the recently received inventory data and the previously determined inventory data is similar enough to indicate that the recently received inventory data is accurate.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method for inventory management comprising:

receiving, via an inventory management application executing on a computing device of an entity associated with a service provider, information from one or more instances of the inventory management application executing on one or more devices operated by one or more users associated with the entity, the inventory management application being provided to the entity by the service provider, wherein an instance of the inventory management application configures a device to generate and transmit the information to the computing device, the device being operable by a user of the one or more users;

determining, by the computing device and based at least in part on the information, a characteristic associated with the user;

provisioning, by the computing device and based at least in part on the characteristic, temporary access to a service functionality associated with the inventory management application to the device, wherein the temporary access enables the device to access, via the instance of the inventory management application, item information associated with one or more items available for acquisition from the entity;

receiving, from the device and based at least in part on provisioning the temporary access, data associated with a first region of a physical store of the entity, the data identifying (i) a number of items in the first region and (ii) at least one associated item type;

generating, by the computing device, aggregated data by aggregating the data with additional data received from at least one other instance of the inventory management application on at least one other device of the one or more devices, the at least one other device being operated by at least one other user of the one or more users; and sending, from the computing device and via the inventory management application, the aggregated data to one or more server computing devices of the service provider to cause the one or more server computing devices to update one or more databases storing inventory data associated with the items available for acquisition from the entity.

2. The computer-implemented method of claim 1, wherein the additional data is associated with the first region of the physical store.

3. The computer-implemented method of claim 1, wherein the additional data is associated with a second region of the physical store that is different than the first region.

4. The computer-implemented method of claim 1, further comprising:

determining, based at least in part on location data associated with the device, that the device is outside of the first region; and terminating the provisioning of the temporary access to the service functionality.

5. The computer-implemented method of claim 4, further comprising:

receiving, from the device, a request to access the service functionality for a second region of the physical store that is different than the first region; and responsive to receiving the request, provisioning, for a second time, temporary access to the service functionality while the device is in the second region.

6. The computer-implemented method of claim 1, further comprising:

determining an expiration of a time interval associated with the provisioning of the temporary access to the service functionality; and terminating the provisioning of the temporary access to the service functionality.

7. The computer-implemented method of claim 1, wherein the data further includes at least one associated item condition.

8. The computer-implemented method of claim 1, further comprising presenting a graphical user interface that graphically represents the aggregated data and provides functionality for the entity to at least one of modify or supplement the aggregated data prior to sending the aggregated data to the service provider.

9. A system comprising:

one or more processors; and one or more computer-readable media storing instructions executable by the one or more processors, the instructions programming the one or more processors to perform operations comprising:

receiving, via an inventory management application executing on a computing device of an entity associated with a service provider, information from one or more instances of the inventory management application executing on one or more devices operated by one or more users associated with the entity, the inventory management application being provided to the entity by the service provider, wherein an instance of the inventory management application configures a device to generate and transmit the information to the computing device, the device being operable by a user of the one or more users;

determining, by the computing device and based at least in part on the information, a characteristic associated with the user;

provisioning, by the computing device and based at least in part on the characteristic, temporary access to a service functionality associated with the inventory management application to the device, wherein the temporary access enables the device to access, via the instance of the inventory management application, item information associated with one or more items available for acquisition from the entity;

receiving, from the device and based on provisioning the temporary access, data associated with a first region of a physical store of the entity, the data identifying (i) a number of items in the first region and (ii) at least one associated item type;

generating, by the computing device, aggregated data by aggregating the data with additional data received from at least one other instance of the inventory management application on at least one other device of the one or more devices, the at least one other device being operated by at least one other user; and sending, from the computing device and via the inventory management application, the aggregated data to one or more server computing devices of the service provider to cause the one or more server computing devices to update one or more databases storing inventory data associated with the items available for acquisition from the entity.

10. The system of claim 9, wherein the additional data is associated with the first region of the physical store.

11. The system of claim 9, wherein the additional data is associated with a second region of the physical store that is different than the first region.

12. The system of claim 9, wherein the operations further comprise:

determining, based at least in part on location data associated with the device, that the device is outside of the first region; and terminating the provisioning of the temporary access to the service functionality.

13. The system of claim 12, wherein the operations further comprise:

receiving, from the device, a request to access the service functionality for a second region of the physical store that is different than the first region; and responsive to receiving the request, provisioning, for a second time, temporary access to the service functionality while the device is in the second region.

14. The system of claim 9, wherein the operations further comprise:

determining an expiration of a time interval associated with the provisioning of the temporary access to the service functionality; and terminating the provisioning of the temporary access to the service functionality.

15. The system of claim 9, wherein the data further includes at least one associated item condition.

16. The system of claim 9, wherein the operations further comprise:

presenting a graphical user interface that graphically represents the aggregated data and provides functionality for the entity to at least one of modify or supplement the aggregated data prior to sending the aggregated data to the service provider.

17. One or more non-transitory computer-readable media maintaining instructions that, when executed by one or more processors, program the one or more processors to perform operations comprising:

receiving, via an inventory management application executing on a computing device of an entity associated with a service provider, information from one or more instances of the inventory management application executing on one or more devices operated by one or more users associated with the entity, the inventory management application being provided to the entity by the service provider, wherein an instance of the inventory management application configures a device to generate and transmit the information to the computing device, the device being operable by a user of the one or more users;

determining by the computing device and based at least in part on the information, a characteristic associated with the user;

provisioning, by the computing device and based at least in part on the characteristic, temporary access to a service functionality associated with the inventory management application to the device, wherein the temporary access enables the device to access, via the instance of the inventory management application, item information associated with items available for acquisition from the entity;

receiving, from the device and based on provisioning the temporary access, data associated with a first region of a physical store of the entity, the data identifying (i) a number of items in the first region and (ii) at least one associated item type;

generating, by the computing device, aggregated data by aggregating the data with additional data received from at least one other instance of the inventory management application on at least one other device of the one or more devices, the at least one other device being operated by at least one other user; and sending, from the computing device and via the inventory management application, the aggregated data to one or more server computing devices of the service provider to cause the one or more server computing devices to update one or more databases storing inventory data associated with the items available for acquisition from the entity.

18. The one or more non-transitory computer-readable media of claim 17, wherein the additional data is associated with the first region of the physical store.

19. The one or more non-transitory computer-readable media of claim 17, wherein the additional data is associated with a second region of the physical store that is different than the first region.

20. The one or more non-transitory computer-readable media of claim 17, wherein the operations further comprise:

determining, based at least in part on location data associated with the device, that the device is outside of the first region; and terminating the provisioning of the temporary access to the service functionality.

* * * * *